United States Patent
Weng (10) Patent No.: US 12,105,913 B2
(45) Date of Patent: Oct. 1, 2024

(54) METHOD FOR TOUCH DETECTION AND ELECTRONIC DEVICE

(71) Applicant: CARUX TECHNOLOGY PTE. LTD., Singapore (SG)

(72) Inventor: Tsan-Po Weng, Tainan (TW)

(73) Assignee: CARUX TECHNOLOGY PTE. LTD., Singapore (SG)

(*) Notice: Subject to any disclaimer, the term of this patent is extended or adjusted under 35 U.S.C. 154(b) by 0 days.

(21) Appl. No.: 18/300,546

(22) Filed: Apr. 14, 2023

(65) Prior Publication Data

US 2023/0376147 A1 Nov. 23, 2023

Related U.S. Application Data (60) Provisional application No. 63/344,072, filed on May 20, 2022.

(51) Int. Cl.
*G06F 3/041* (2006.01)

(52) U.S. Cl.
CPC .......... *G06F 3/0418* (2013.01); *G06F 3/0412* (2013.01); *G06F 3/04182* (2019.05); *G06F 3/041* (2013.01)

(58) Field of Classification Search
CPC ...... G06F 3/041; G06F 3/0412; G06F 3/0418; G06F 3/0482; G06F 3/04182
USPC ...................................................... 345/173
See application file for complete search history.

(56) References Cited

U.S. PATENT DOCUMENTS

| | | | |
|---|---|---|---|
| 2013/0063370 A1* | 3/2013 | Lee | G06F 3/04186 345/173 |
| 2013/0222338 A1* | 8/2013 | Gim | G06F 3/04186 345/173 |
| 2014/0184563 A1* | 7/2014 | Yeh | G06F 1/3262 345/173 |
| 2015/0220170 A1* | 8/2015 | Nam | G06F 3/041 345/173 |
| 2015/0277659 A1* | 10/2015 | Lu | G06F 3/04186 345/173 |
| 2017/0315631 A1* | 11/2017 | Pourbigharaz | G06F 3/0418 |
| 2018/0239493 A1* | 8/2018 | Khazeni | G06F 3/0443 |
| 2019/0034023 A1* | 1/2019 | Yeh | G06F 3/03545 |
| 2020/0241665 A1* | 7/2020 | Fu | G06F 3/04166 |
| 2022/0066591 A1* | 3/2022 | Meng | G06F 3/0418 |
| 2023/0011852 A1* | 1/2023 | Yao | G06F 3/04186 |
| 2023/0013855 A1* | 1/2023 | Endo | G01D 5/24 |
| 2023/0028217 A1* | 1/2023 | Seger, Jr. | G06F 3/04182 |
| 2023/0176689 A1* | 6/2023 | Lee | G09G 5/003 345/173 |

* cited by examiner

*Primary Examiner* — Tom V Sheng
(74) *Attorney, Agent, or Firm* — McClure, Qualey & Rodack, LLP (57) ABSTRACT

A method for touch detection is provided. The method is suitable for an electronic device with multiple sensing units. The method includes the following stages. Raw signal intensity distribution is obtained through the sensing units. A signal intensity determination process is performed. A signal processing process is performed according to the result of the signal intensity determination process. The signal processing process is performed in a first mode when the raw signal intensity of at least one sensing unit is higher than a first threshold. The signal processing process is performed in a second mode when the raw signal intensity of all the sensing units is lower than a second threshold.

18 Claims, 8 Drawing Sheets

| 702 — 10000 | >10000 (708) | 800 — 714 |
|---|---|---|
| 704 — 20 | 710<br>5 | 100 — 716 |
| 706 — 8000 | 200 (712) | 40 — 718 |

| 722 — 5 | 2 (728) | 1 — 734 |
|---|---|---|
| 724 — 1 | 730<br>5 | 8 — 736 |
| 726 — 3 | 6 (732) | 2 — 738 |

METHOD FOR TOUCH DETECTION AND ELECTRONIC DEVICE

CROSS REFERENCE TO RELATED APPLICATIONS

This application claims the benefit of U.S. Provisional Application No. 63/344,072, filed on May 20, 2022, and China Application 202310118730.0, filed on Feb. 3, 2023, the entirety of which is incorporated by reference herein.

BACKGROUND OF THE DISCLOSURE

Field of the Invention

The present invention relates to a method for touch detection, and, in particular, to a method for dynamically setting multiple noise thresholds.

Description of the Related Art

The sensing results from an embedded touch panel are prone to false detection in environments that experience a high degree of interference. In the prior art, this false detection can be corrected by means of debouncing. However, in some less disturbing environments, such a debounce uses up additional time and power.

BRIEF SUMMARY OF THE DISCLOSURE

An embodiment of the present disclosure provides a method for touch detection. The method is applicable for an electronic device with multiple sensing units. The method includes the following stages. Raw signal intensity distribution is obtained from the sensing units. A signal intensity determination process is performed. A signal processing process is performed according to the result of the signal intensity determination process. The signal processing process is performed in a first mode when the raw signal intensity of at least one sensing unit is higher than a first threshold. The signal processing process is performed in a second mode when the raw signal intensity of all the sensing units is lower than a second threshold.

An embodiment of the present disclosure also provides an electronic device. The electronic device includes multiple sensing units and a touch-panel sensing chip. The touch-panel sensing chip is electrically connected to the sensing units through sensing lines. The touch-panel sensing chip performs the following stages. Raw signal intensity distribution is obtained through the sensing units. A signal intensity determination process is performed. A signal processing process is performed according to the result of the signal intensity determination process. The signal processing process is performed in a first mode when the raw signal intensity of at least one sensing unit is higher than a first threshold. The signal processing process is performed in a second mode when the raw signal intensity of all the sensing units is lower than a second threshold.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

In order to make the above purposes, features, and advantages of some embodiments of the present disclosure more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present disclosure are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present disclosure.

Figure 1:
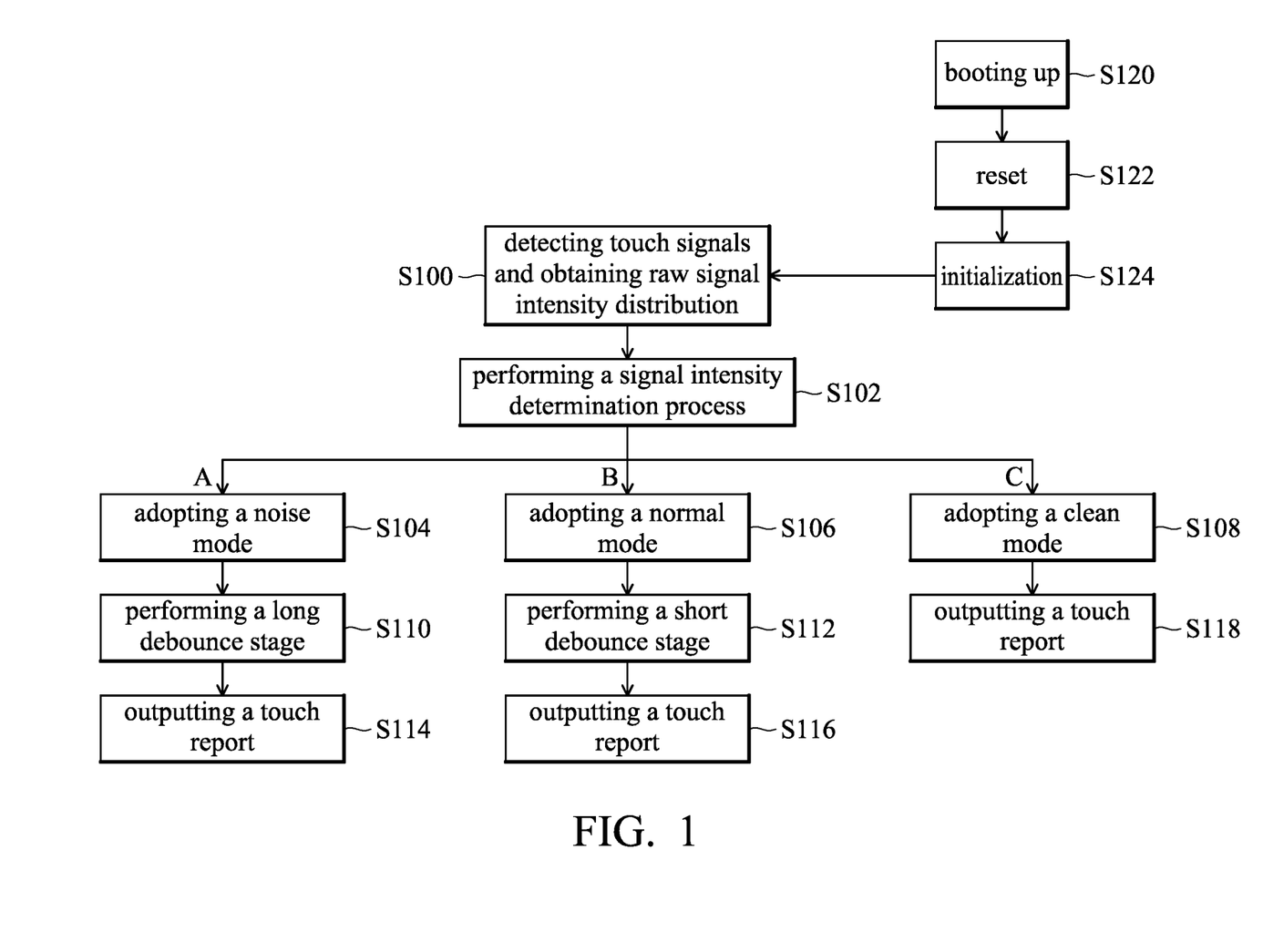
FIG. 1 is a flow chart of a method for touch detection in accordance with some embodiments of the present disclosure.

In the present disclosure, the electronic device in FIG. 1 in the present disclosure may include a display device, a backlight device, an antenna device, a sensing device, or a splicing device, etc., but is not limited thereto. The electronic device may be a bendable or flexible electronic device. The display device may be a non-self-luminous display device or a self-luminous display device. The antenna device may be a liquid crystal antenna device or a non-liquid crystal antenna device, and the sensing device may be a sensing device for sensing capacitance, light, heat, or ultrasonic waves, but is not limited thereto. The electronic components may include passive and active components, such as capacitors, resistors, inductors, diodes, transistors, and the like. The diodes may include light-emitting diodes or photodiodes. The light-emitting diode may include organic light-emitting diode (OLED), inorganic light-emitting diode, micro-LED, mini-LED, quantum dot light-emitting diode (QLED, QDLED), other suitable materials or a combination of the above materials, but is not limited thereto. The splicing device may be, for example, a splicing display device or a splicing antenna device, but is not limited thereto. In addition, the display device in the electronic device may be a color display device or a monochrome display device, and the shape of the electronic device may be rectangular, circular, polygonal, a shape with curved edges, or other suitable shapes. In addition, the electronic device described below uses, as an example, the sensing of a touch through an embedded touch device, but the touch-sensing method is not limited thereto, and another suitable touch-sensing method can be used provided that it meets all requirements.

FIG. 1 is a flow chart of a method for touch detection in accordance with some embodiments of the present disclosure. The method for touch detection of the present disclosure is applicable to an electronic device with multiple sensing units. As shown in FIG. 1, the method for touch detection includes the following stages. Touch signals are detected and raw signal intensity distribution is obtained through the sensing units (step S100). A signal intensity determination process is performed (step S102). A signal processing process is performed according to the result of the signal intensity determination process. The signal processing process is performed in a noise mode when a condition A is met (step S104). The condition A is met when the raw signal intensity of at least one sensing unit is higher than a first threshold. When the condition A is met, a long debounce stage is performed (step S110) and a touch report is output (step S114). The signal processing process is performed in a normal mode when a condition B is met (step S106). The condition B is met when the raw signal intensity of all the sensing units is between the first threshold and a second threshold. When the condition B is met, a short debounce stage is performed (step S112) and the touch report is output (step S116). The signal processing process is performed in a clean mode when a condition C is met (step S108). The condition C is met when the raw signal intensity of all the sensing units is lower than the second threshold. When the condition C is met, the touch report is output (step S118). As can be seen from the above description, after the above signal processing, the touch report can display the actual touch position of the user, reducing the misjudgment of the touch position due to noise.

In some embodiments, the method for touch detection of the present disclosure further includes pre-steps before steps S100~S118, for example, booting up (step S120), reset (step S122), and initialization (step S124), but the present disclosure is not limited thereto. In step S100, the present disclosure obtains raw signals including the noise by detecting the touch. Similarly, in step S100, the raw signal intensity distribution refers to the distribution of raw signal intensity, which can indicate the raw signal intensity detected in various regions in a panel. In some embodiments, in step S102, when the condition A is met, that is, the raw signal intensity of at least one sensing unit is higher than the first threshold, it means that the raw signal received by the at least one sensing unit contains strong noise, so the noise needs to be adopted. In the noise mode, the signal processing process performed by the method for touch detection further includes a first driving stage and a second driving stage (as shown in FIG. 4C) in addition to the long debounce stage in step S110. In some embodiments, the first driving stage and the second driving stage are both earlier than the long debounce stage, and the first driving stage is earlier than the second driving stage. In step S114, according to the method for touch detection of the present disclosure (for example, the long decounce stage, the first driving stage, and/or the second driving stage), the touch signals that are noise filtered are output to generate the touch report. For the convenience of distinction, in this disclosure, the initial result obtained by the sensing unit after detecting the touch is called "raw signal", and the final output result is called "touch signal". In the present disclosure, in the normal mode and the noise mode, the raw signal needs to be performed the debounced stage before it becomes the touch signal.

In some embodiments, in step S102, when the condition B is met, that is, the raw signal intensity of all the sensing units are between the first threshold and the second threshold, it means that all the sensing units receives the noise with normal intensity, so the normal mode is adopted. In the normal mode, the signal processing process performed by the method for touch detection further includes a first driving stage (as shown in FIG. 4B) in addition to the short debounce stage in step S112. In some embodiments, the first driving stage is earlier than the short decounce stage. In step S116, the touch signals that are noise filtered are output to generate the touch report according to the method for touch detection of the present disclosure. It is noted that, in some embodiments, the duration of the long debounce stage of step S110 in the noise mode is longer than that of the short debounce stage of step S112 in the normal mode.

In some embodiments, in step S102, when the condition C is met, that is, the raw signal intensity of all the sensing units is lower than the second threshold, it means that the noise received by all the sensing units is weak, or even no noise, so the clean mode is adopted. In the clean mode, the signal processing process performed by the method for touch detection does not include the debounce stage, but includes a first driving stage. In step S118, the touch signals are output to generate the touch report according to the method for touch detection of the present disclosure. In some embodiments, in step S100, the detected raw signal can be read and/or processed through a touch-panel sensing chip.

Figure 2:
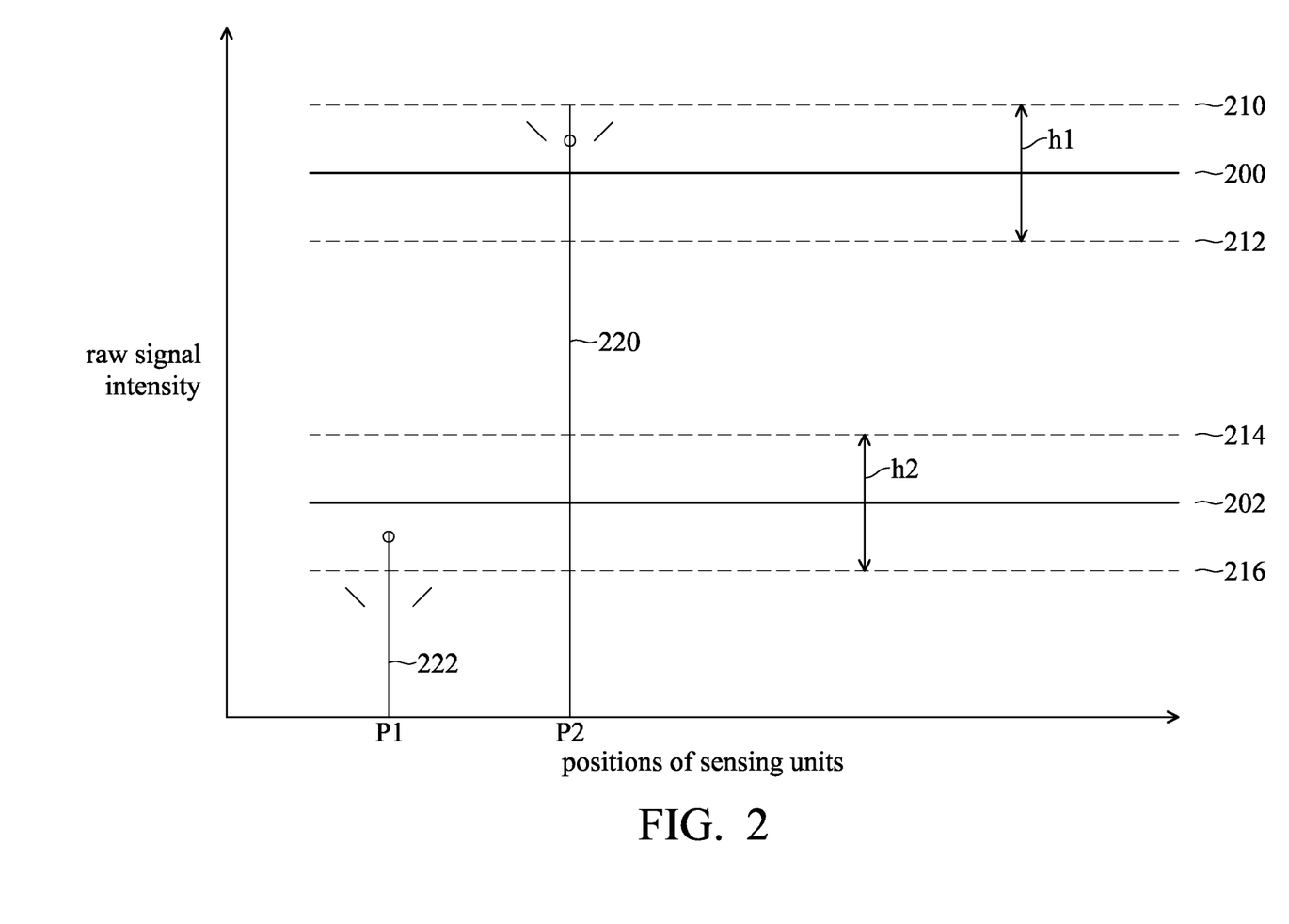
FIG. 2 is a schematic diagram of raw signal thresholds in accordance with some embodiments of the present disclosure.

FIG. 2 is a schematic diagram of raw signal thresholds in accordance with some embodiments of the present disclosure. The horizontal axis in FIG. 2 represents positions of the sensing units, and the vertical axis represents raw signal intensity. In FIG. 2, a first threshold 200, a second threshold 202, a first buffer zone upper limit 210, a first buffer zone lower limit 212, a second buffer zone upper limit 214, and a second buffer zone lower limit 216 are marked. In some embodiments, the first buffer zone upper limit 210 is approximately equal to the intensity obtained by multiplying the first threshold value 200 by 105%. The first buffer zone lower limit 212 is approximately equal to the value obtained by multiplying the first threshold value 200 by 95%. Similarly, the second buffer zone upper limit 214 is approximately equal to the intensity obtained by multiplying the second threshold value 202 by 105%. The second buffer zone lower limit 216 is approximately equal to the intensity obtained by multiplying the second threshold value 202 by 95%. In other words, the range h1 of the first buffer zone is equal to 10% of the first threshold 200. The range h2 of the second buffer zone is equal to 10% of the second threshold 202. In some embodiments, when the raw signal is within the range of the first buffer zone or the second buffer zone, additional judgment conditions may be used to determine the corresponding signal processing mode.

As shown in FIG. 2, the intensity of the raw signal 220 measured by the sensing units at the position P2 is higher than the first threshold 200, and the intensity of the raw signal 222 measured by the sensing units at the position P1 is lower than the second threshold 202, but the present disclosure is not limited thereto. In some embodiments, a panel of the electronic device of the present disclosure may be divided into multiple regions. One of the regions may correspond to one of the sensing units, but the present disclosure is not limited thereto. It is noted that the electronic device of the present disclosure does not necessarily determine which mode to use to process the raw signal in each touch detection. In some embodiments, the electronic device may only determine once after the number of intervals, and then process the raw signal according to the selected mode after the determination until the next determination is made again. The number of intervals may be a preset value, or be decided through a decision mechanism. The number of intervals may be determined according to the environment of the electronic device. For example, when the number of intervals is set to 20, step S102 in FIG. 1 of the present disclosure averages 20 raw data corresponding to each region (that is, 20 raw signals obtained by detecting 20 times per sensing unit), so that each sensing unit obtains average intensity. If all average intensity corresponding to all regions (i.e., corresponding to all the sensing units) is lower than the second threshold 202, the present disclosure performs step S108 in FIG. 1, and performs the signal processing process in the clean mode. If the average intensity corresponding to at least one region (that is, corresponding to at least one of the sensing units) is higher than the first threshold 200, the present disclosure performs step S104 in FIG. 1, and performs the signal processing process in the noise mode. If the average intensity corresponding to all regions (i.e., corresponding to all the sensing units) is between the first threshold 200 and the second threshold 202, the present disclosure performs step S106 in FIG. 1, and performs the signal processing process in the normal mode.

Figure 3:
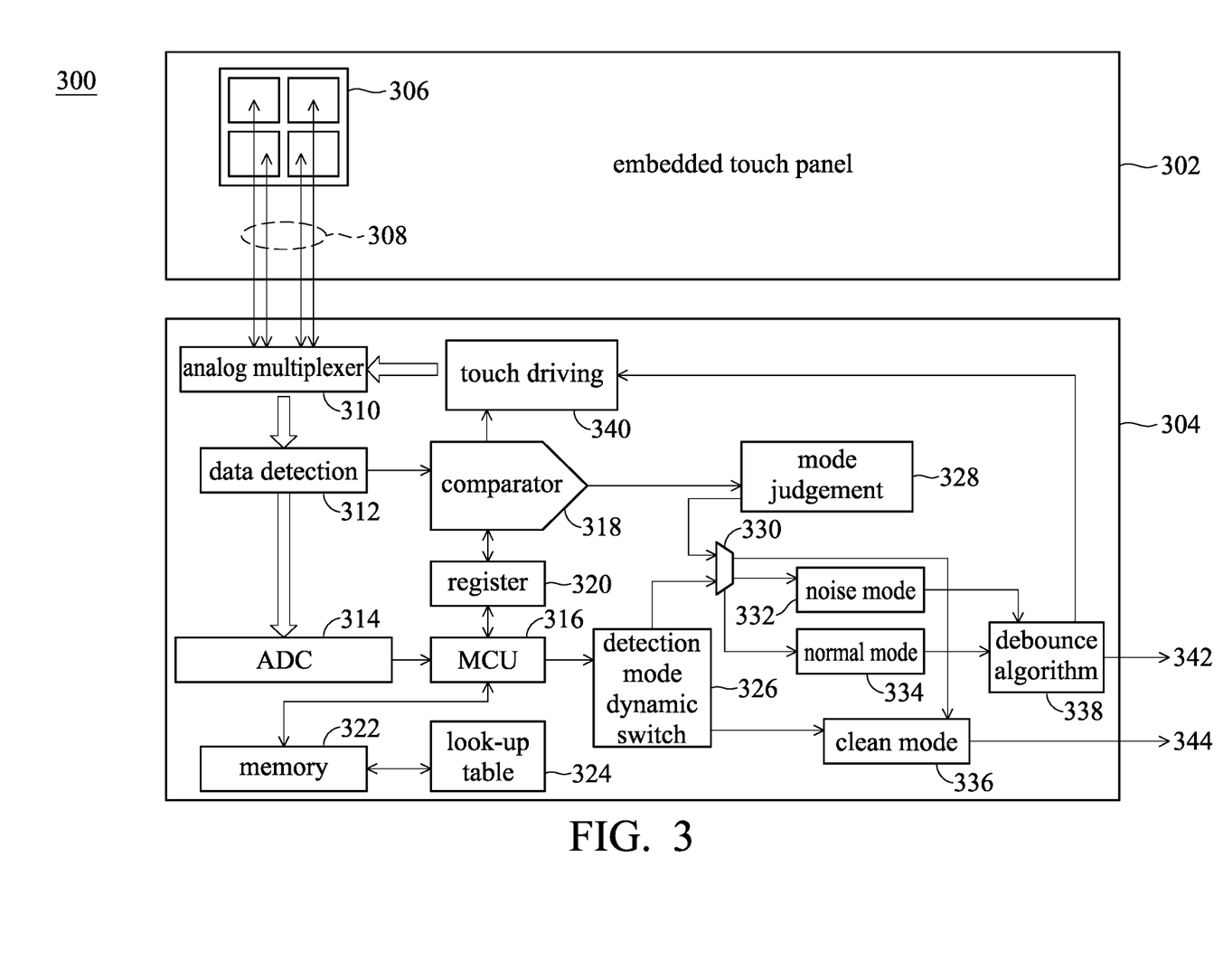
FIG. 3 is a schematic diagram of an electronic device applicable to the method for touch detection in FIG. 1 in accordance with some embodiments of the present disclosure.

FIG. 3 is a schematic diagram of an electronic device 300 applicable to the method for touch detection in FIG. 1 in accordance with some embodiments of the present disclosure. As shown in FIG. 3, the electronic device 300 includes but not limited to an embedded touch panel 302 and a touch-panel sensing chip 304. The embedded touch panel 302 includes multiple sensing units 306 for detecting touch. The touch-panel sensing chip 304 receives raw signals from the sensing units 306 through sensing lines 308 to obtain raw signal intensity distribution, and processes the raw signals according to different modes to output touch signals. In some embodiments, the touch-panel sensing chip 304 includes but not limited to an analog multiplexer 310, a data detection function block 312, an analog-to-digital converter (ADC) 314, a microcontroller (MCU) 316, a comparator 318, a register 320, a memory 322, a look-up table function lock 324, a detection mode dynamic switch 326, a mode judgment function block 328, a logic judger 330, a noise mode function block 332, a normal mode function block 334, a clean mode function block 336, a debounce algorithm function block 338, and a touch driving function block 340.

In detail, the analog multiplexer 310 collects the raw signals from the sensing units 306, and correspondingly sends the raw signal of the region specified in the touch driving function block 340 to the data detection function block 312. In some embodiments, the raw signal is an analog signal. The comparator 318 extracts the raw signal from the data detection function block 312, refers to the threshold setting data stored in the register 320, and outputs a mode digital signal correspondingly. The mode judgment function block 328 receives the mode digital signal from the comparator 318, and determines the adopted mode according to the mode digital signal, and then outputs a judgment result. For example, if the mode digital signal received by the mode judgment function block 328 is "0000", the mode judgment function block 328 determines that the adopted mode is the clean mode 336. If the mode digital signal received by the mode judgment function block 328 is "0101", the mode judgment function block 328 determines that the adopted mode is the normal mode 334. If the mode digital signal received by the mode judgment function block 328 is "1010", the mode judgment function block 328 determines that the adopted mode is the noise mode 332. It is noted that the above-mentioned values of the mode digital signal for different modes are only examples, the present disclosure is not limited thereto.

On the other hand, analog-to-digital converter 314 converts the raw signal from the data detection function block 312 into a digital signal, and sends the digital signal to the microcontroller 316. The digital signal corresponds to the raw signal, which is the initial touch detection result including noise. In some embodiments, the microcontroller 316 outputs a control signal to the detection mode dynamic switch 326 according to the threshold setting data stored in the register 320 and the noise information in the raw signal included in the digital signal. The detection mode dynamic switch 326 outputs switch setting data according to the control signal from the microcontroller 316. The logic judger 330 performs logical determination on the judgment result from the mode determination function block 328 and the switch setting data from the detection mode dynamic switch 326 to finally determine the signal processing mode.

In some embodiments, if the touch-panel sensing chip 304 determines that the noise mode 332 and the normal mode 334 need to be adopted, the touch-panel sensing chip 304 also needs to perform the debounce stage (for example, performed by the debounce algorithm function block 338 in FIG. 3). In some embodiments, after the touch-panel sensing chip 304 completes the debounce stage, the touch-panel sensing chip 304 directly outputs a touch report 342. In some embodiments, after the touch-panel sensing chip 304 completes the debounce stage, the touch driving can be performed again (for example, performed by the touch driving function block 340). If the touch-panel sensing chip 304 determines that the clean mode 336 need to be adopted, the touch-panel sensing chip 304 directly outputs a touch report 344. In some embodiments, the microcontroller 316 reads the preset data stored in the memory 322, and the look-up data function (for example, the look-up table function block 324) is used to analyze and configure the digital signal. In other words, the control signal output by the microcontroller 316 to the detection mode dynamic switch 326 may include a switch setting corresponding to the raw signal.

Figure 4A:
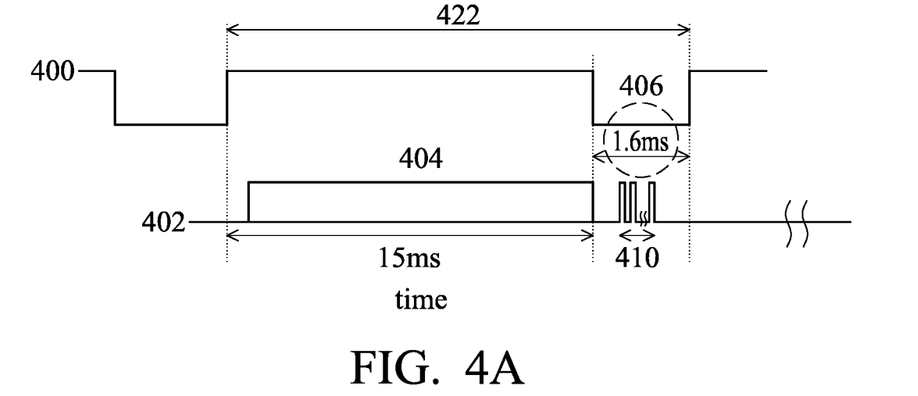
FIG. 4A is a waveform diagram of performing a signal processing process in a clean mode in accordance with some embodiments of the present disclosure.
Figure 4B:
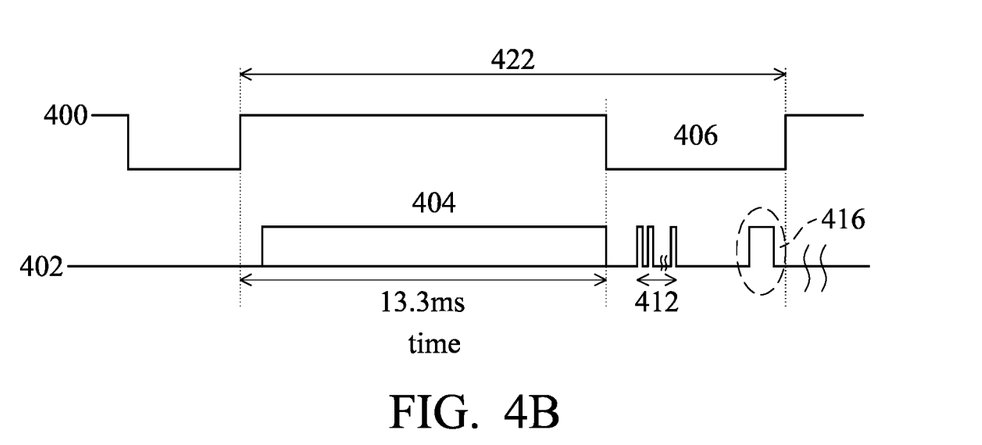
FIG. 4B is a waveform diagram of performing the signal processing process in a normal mode in accordance with some embodiments of the present disclosure.
Figure 4C:
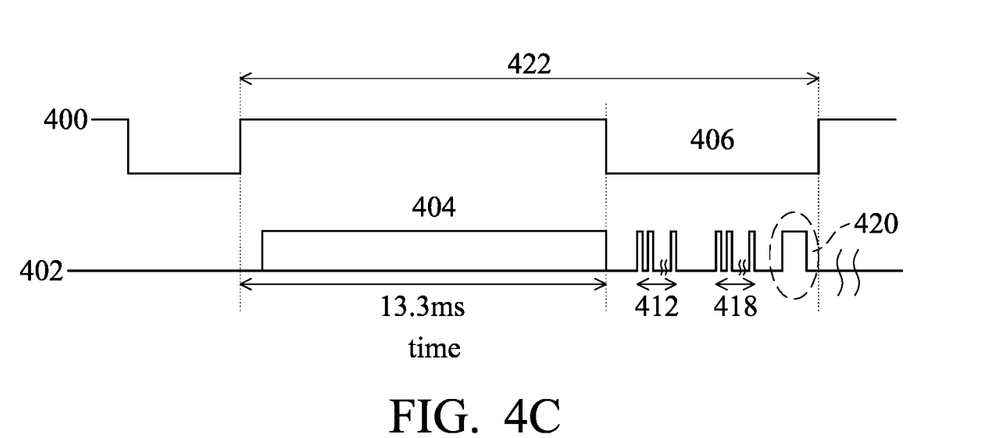
FIG. 4C is a waveform diagram of performing the signal processing process in a noise mode in accordance with some embodiments of the present disclosure.

FIG. 4A is a waveform diagram of performing a signal processing process in a clean mode in accordance with some embodiments of the present disclosure. As shown in FIG. 4A, a synchronization signal 400 corresponds to the display period or the touch period of the electronic device of the present disclosure. For example, when the synchronization signal 400 is at a logic high level, the electronic device of the present disclosure is driven to display images, thus corresponding to the display period 404. From the end of the display period and the start of the next display period 404, the sensing units of the electronic device performs touch detection and enters the touch period 406. At this time, the synchronization signal 400 is at a logic low level and does not drive the electronic device to display images. In some embodiments of FIG. 4A, when the image display frequency is 60 times per second, the duration of a display frame 422 can be, for example, 16.6 milliseconds. The display period 404 can be 15 milliseconds. The touch period can be 1.6 milliseconds, and is between the two display periods 404. That is to say, the touch period 406 for performing touch detection is located in the time interval between displaying one image and another image, but the present disclosure is not limited thereto. The driving signal 402 drives multiple display units in the electronic device to display images during the display period 404. The driving signal 402 drives the sensing units in the electronic device to perform touch detection during the touch period 406, for example, a driving stage 410. It is noted that the driving signal 402 referred to here is a general term for the driving signal for driving the display function and another driving signal for driving the touch detection function, but it does not mean that the sources and/or waveforms of the two driving signals are the same. In some embodiments of FIG. 4A, since the method for touch detection of the present disclosure performs the signal processing process in a clean mode, the signal processing process does not include a debounce stage.

FIG. 4B is a waveform diagram of performing the signal processing process in a normal mode in accordance with some embodiments of the present disclosure. As shown in FIG. 4B, similar to FIG. 4A, the logic high level region of the synchronization signal 400 corresponds to the display period 404, and the logic low level region of the synchronization signal 400 corresponds to the touch period 406. In some embodiments of FIG. 4B, when the image display frequency is 60 times per second, the duration of the display frame 422 can be, for example, 16.6 milliseconds. The display period 404 can be 13.3 milliseconds, but the present disclosure is not limited thereto. The driving signal 402 drives multiple display units in the electronic device to display images during the display period 404. The driving signal 402 drives the sensing units in the electronic device to perform touch detection during the touch period 406 including a driving stage 412 and a debounce stage 416. It is noted that the driving signal 402 referred to here is a general term for the driving signal for driving the display function, the driving signal for driving the touch detection function, and another driving signal for driving the debounce function, but it does not mean that the sources and/or waveforms of the three driving signals are the same. After adding the debounce function, the touch period 406 in FIG. 4B is longer than the touch period 406 in FIG. 4A, that is, the touch period 406 in FIG. 4B is longer than 1.6 milliseconds (for example, 3.3 milliseconds).

FIG. 4C is a waveform diagram of performing the signal processing process in a noise mode in accordance with some embodiments of the present disclosure. As shown in FIG. 4C, similar to FIG. 4A, the logic high level region of the synchronization signal 400 corresponds to the display period 404, and the logic low level region of the synchronization signal 400 corresponds to the touch period 406. In some embodiments of FIG. 4C, when the image display frequency is 60 times per second, the duration of the display frame 422 can be, for example, 16.6 milliseconds. The display period 404 can be 13.3 milliseconds, and the touch period 406 can be 3.3 milliseconds, but the present disclosure is not limited thereto. The driving signal 402 drives multiple display units in the electronic device to display images during the display period 404. The driving signal 402 drives the sensing units in the electronic device to perform touch detection during the touch period 406 including a first driving stage 412, a second driving stage 418, and a debounce stage 420. It is noted that the driving signal 402 referred to here is a general term for the driving signal for driving the display function, the driving signal for driving the touch detection function for the first time and the second time, and another driving signal for driving the debounce function, but it does not mean that the sources and/or waveforms of the three driving signals are the same. The touch period 406 (3.3 milliseconds) in FIG. 4C is longer than the touch period 406 (1.6 milliseconds) in FIG. 4A, that is, the touch period 406 in FIG. 4C is longer than 1.6 milliseconds. Due to the long debounce stage, in some embodiments, the duration of the debounce stage 420 in FIG. 4C is longer than that of the debounce stage 416 in FIG. 4B. In some embodiments, the number of pulses of the driving signal 402 in the first driving stage 412 is deferent from the number of pulses of the driving signal 402 in the second driving stage 418, but the present disclosure is not limited thereto.

Figure 5:
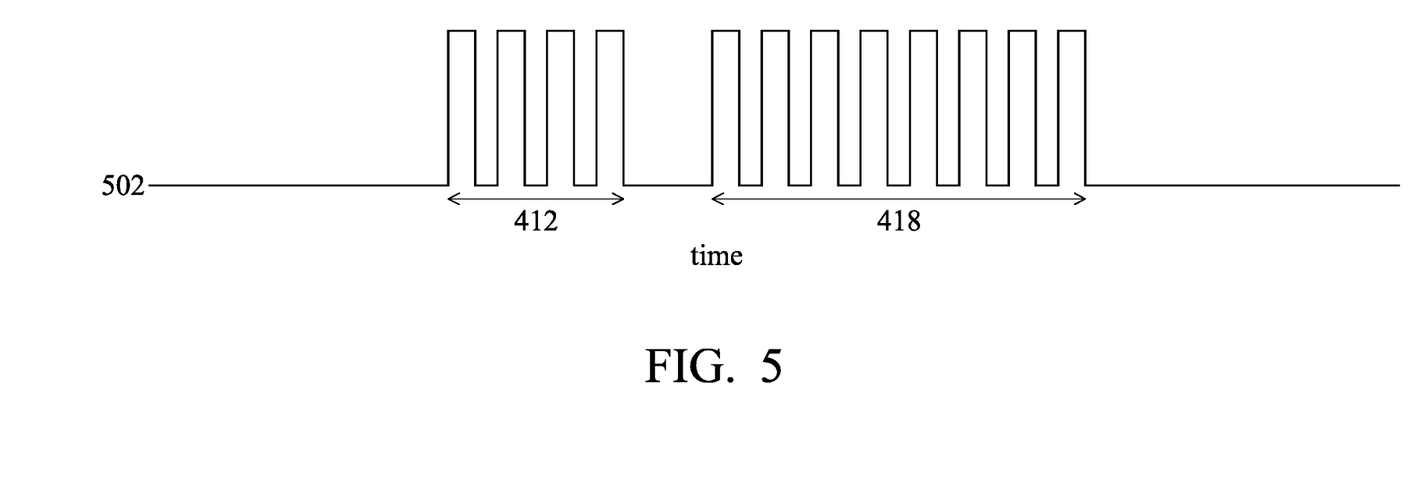
FIG. 5 is a detailed waveform diagram of performing a first driving stage and a second driving stage in the noise mode in accordance with some embodiments of the present disclosure.

FIG. 5 is a detailed waveform diagram of performing a first driving stage and a second driving stage in the noise mode in accordance with some embodiments of the present disclosure. As shown in FIG. 5, the driving signal 502 drives the sensing units of the electronic device in the noise mode, including the first driving stage 412 and the second driving stage 418. In some embodiments of FIG. 5, the number of pulses of the driving signal 502 in the first driving stage 412 is 4. The number of pulses of the driving signal 502 in the second driving stage 418 is 8, but the present disclosure is not limited thereto. In other words, the number of pulses of the driving signal 502 in the second driving stage 418 in the noise mode is larger than the number of pulses of the driving signal 502 in the first driving stage 412 in the normal mode, but the present disclosure is not limited thereto. In some embodiments, the number of pulses of the driving signal 502 in the first driving stage 412 plus the number of pulses of the driving signal 502 in the second driving stage 418 is larger than 10, but the present disclosure is not limited thereto.

Figure 6A:
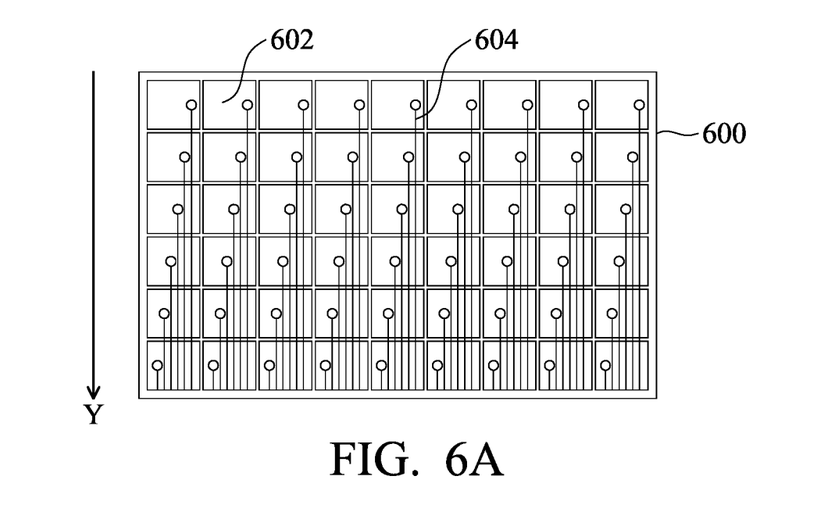
FIG. 6A is a schematic diagram of an electronic device applicable to the method for touch detection in FIG. 1 in accordance with some embodiments of the present disclosure.

FIG. 6A is a schematic diagram of an electronic device 600 applicable to the method for touch detection in FIG. 1 in accordance with some embodiments of the present disclosure. As shown in FIG. 6A, the electronic device 600 includes multiple sensing units 602, and each of the sensing units 602 is electrically connected to one of sensing lines 604. The sensing lines 604 are used to send touch signals from the sensing units 602 to the touch-panel sensing chip 304 in FIG. 3. In some embodiments, the electronic device 600 further includes multiple display units (not shown), and the display units and the sensing units 602 can be disposed corresponding to each other. For example, the respective display units are disposed below the respective sensing units 602, and the sensing units may fully or partially overlap one or more display units from a top-view perspective, but the present disclosure is not limited thereto.

Figure 6B:
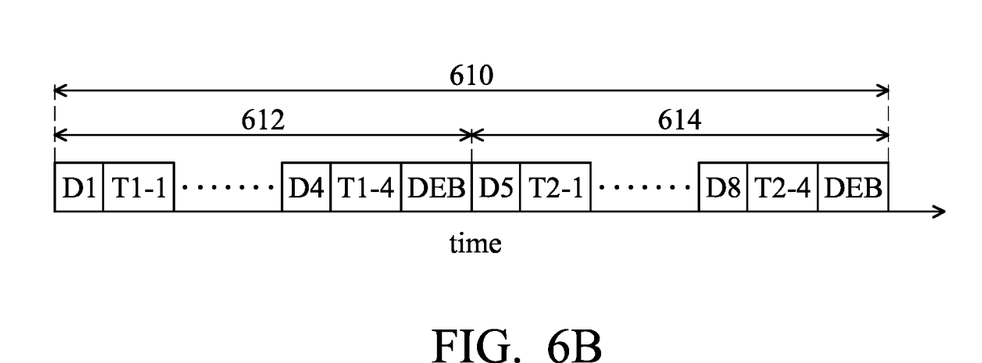
FIG. 6B is a timing diagram of driving signals during performing the signal processing process in the normal mode and the noise mode in accordance with some embodiments of the present disclosure.

FIG. 6B is a timing diagram of driving signals during performing the signal processing process in the normal mode and the noise mode in accordance with some embodiments of the present disclosure. As shown in FIG. 6B, when the image display frequency is 60 times per second, the duration of a display frame 610 can be, for example, 16.6 milliseconds, but the disclosure is not limited thereto. In some embodiments of FIG. 6B, the display frame 610 includes a sub-frame 612 and a sub-frame 614. If the display region of the electronic device 600 is divided into two blocks, an image corresponding to one of the blocks may be display in the sub-frame 612, and an image corresponding to the other block may be displayed in the sub-frame 614. In some embodiments, the duration of the sub-frame 612 and the duration of the sub-frame 614 are both 8.3 milliseconds, but the present disclosure is not limited thereto. In some embodiments, the sub-frame 612 includes a display driving stage D1, a touch driving stage T1-1, a display driving stage D2, a touch driving stage T1-2, a display driving stage D3, a touch driving stage T1-3, a display driving stage D4, a touch driving stage T1-4, and a debounce stage DEB. The sub-frame 614 includes a display driving stage D5, a touch driving stage T2-1, a display driving stage D6, a touch driving stage T2-2, a display driving stage D7, a touch driving stage T2-3, a display driving stage D8, a touch driving stage T2-4, and a debounce stage DEB. In some embodiments of FIG. 6B, the display driving stage and the touch driving stage are performed alternately. For example, refer to both FIG. 6A and FIG. 6B, the two blocks in the display region of the electronic device 600 are further divided into four small blocks. Therefore, the display region of the electronic device 600 has a total of eight small blocks. All sensing units 602 of the electronic device 600 are further divided into four groups. In the display driving stage D1, the display driving stage D2, the display driving stage D3, and the display diving stage D4 of the sub-frame 612, the driving signals for driving the display function drive the display units in the four small blocks respectively. In the touch driving stage T1-1, the touch driving stage T1-2, the touch driving stage T1-3, and the touch driving stage T1-4 in the same sub-frame 612, the driving signals for driving the touch detection function drive four groups of sensing units 602 respectively, and a touch report is obtained after the debounce stage DEB. Similarly, in the display driving stage D5, the display driving stage D6, the display driving stage D7, and the display diving stage D8 of the sub-frame 614, the driving signals for driving the display function drive the display units in the other four small blocks respectively. In the touch driving stage T2-1, the touch driving stage T2-2, the touch driving stage T2-3, and the touch driving stage T2-4 in the same sub-frame 614, the driving signals for driving the touch detection function drive the four groups of sensing units 602 again respectively, and a second touch report is obtained after the debounce stage DEB. That is to say, in one display frame 610, an image is displayed once, but the touch detection function is performed twice. Therefore, in some embodiments, the touch detection frequency is twice the frame refresh frequency. However, the ratio of the touch detection frequency to the frame refresh frequency in this disclosure is not limited thereto. In some embodiments, according to the difference between the display region and the number of groups of all sensing units, the touch detection frequency is an integer multiple of the frame refresh frequency, and the integer can be greater than or equal to 2.

Figure 6C:
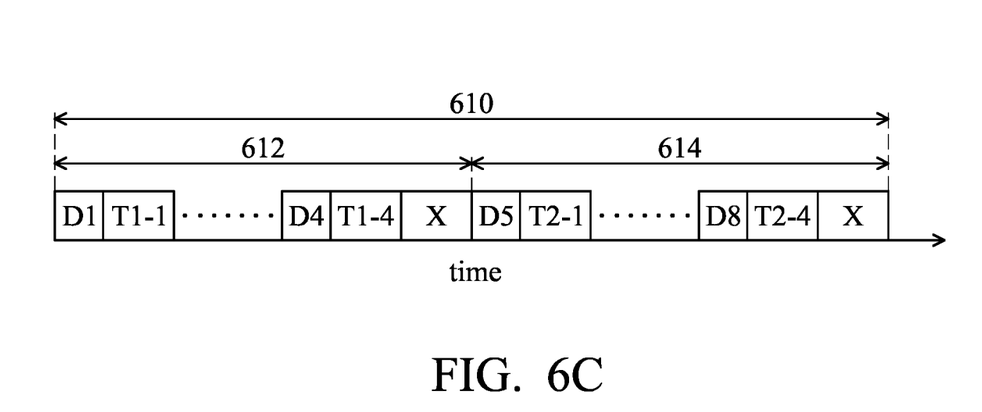
FIG. 6C is a timing diagram of driving signals during performing the signal processing process in the clean mode in accordance with some embodiments of the present disclosure.

FIG. 6C is a timing diagram of driving signals during performing the signal processing process in the clean mode in accordance with some embodiments of the present disclosure. The difference between FIG. 6C and FIG. 6B is that, in FIG. 6C, the last period of the sub-frame 612 and the sub-frame 614 does not have the debounce stage DEB. In other words, in the clean mode, the signal processing process performed by the method for touch detection of the present disclosure does not include the debounce stage DEB.

Figure 7A:
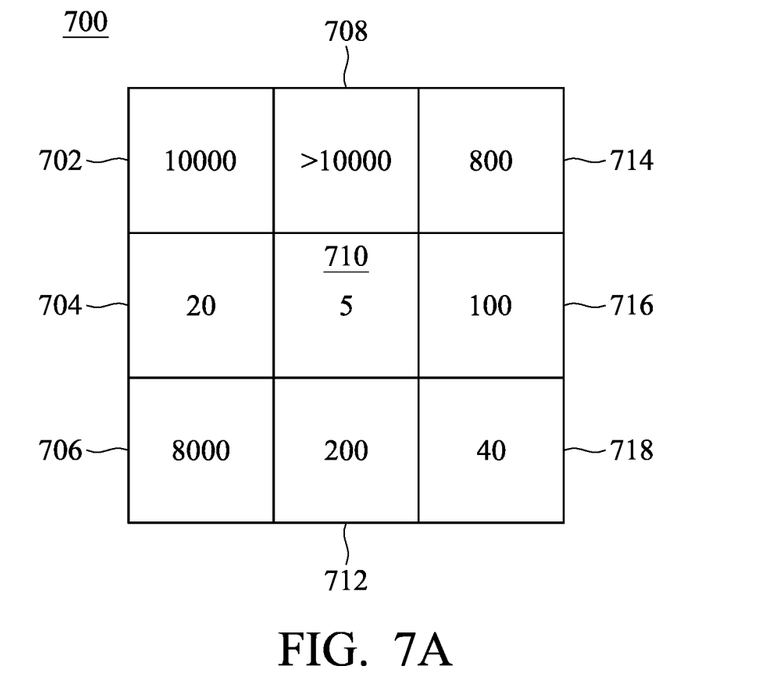
FIG. 7A is a schematic diagram of signal intensity distribution in the noise mode in accordance with some embodiments of the present disclosure.

FIG. 7A is a schematic diagram of signal intensity distribution in the noise mode in accordance with some embodiments of the present disclosure. As shown in FIG.

7A, a local region of an electronic device 700 includes nine regions, such as region 702, region 704, region 706, region 708, region 710, region 712, region 714, region 716, and region 718. In some embodiments of FIG. 7A, if the first threshold is 1000 and the second threshold is 50, the raw signal intensity of at least one sensing units is higher than the first threshold (for example, region 702, region 706, and region 708), the method for touch detection of the present disclosure performs signal processing process in the noise mode.

Figure 7B:
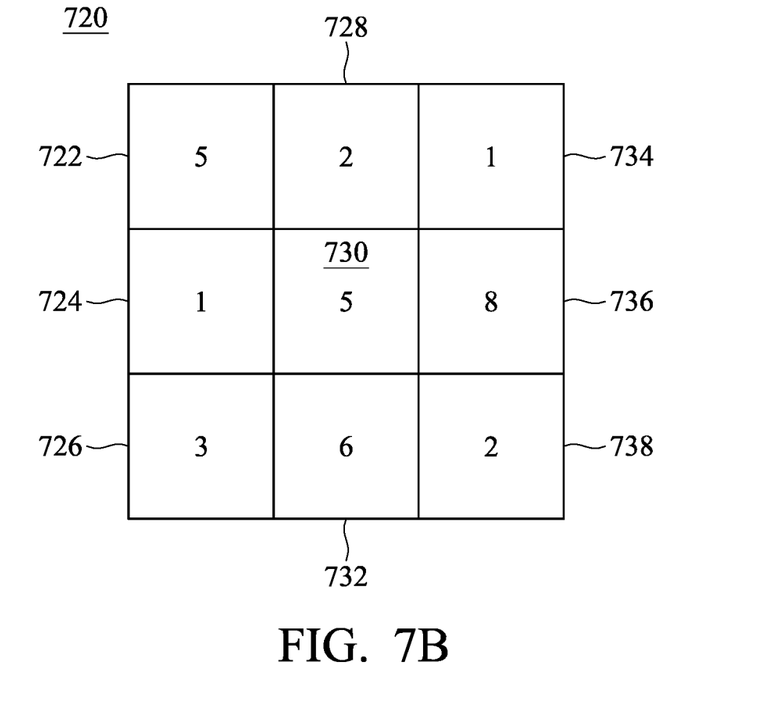
FIG. 7B is a schematic diagram of signal intensity distribution in the clean mode in accordance with some embodiments of the present disclosure.

FIG. 7B is a schematic diagram of signal intensity distribution in the clean mode in accordance with some embodiments of the present disclosure. Similar to FIG. 7A, the electronic device 720 may be, for example, an in-cell touch panel. A local region of the electronic device 720 may include 9 regions corresponding to 9 sensing units, such as region 722, region 724, region 726, region 728, region 730, region 732, region 734, region 736, and region 738. If the first threshold is 1000 and the second threshold is 50, the raw signal intensity of all regions is lower than the second threshold, the method for touch detection of the present disclosure performs signal processing process in the clean mode. In some embodiments, if the raw signal intensity of all regions is between the first threshold and the second threshold, the method for touch detection of the present disclosure performs signal processing process in the normal mode.

Figure 8:
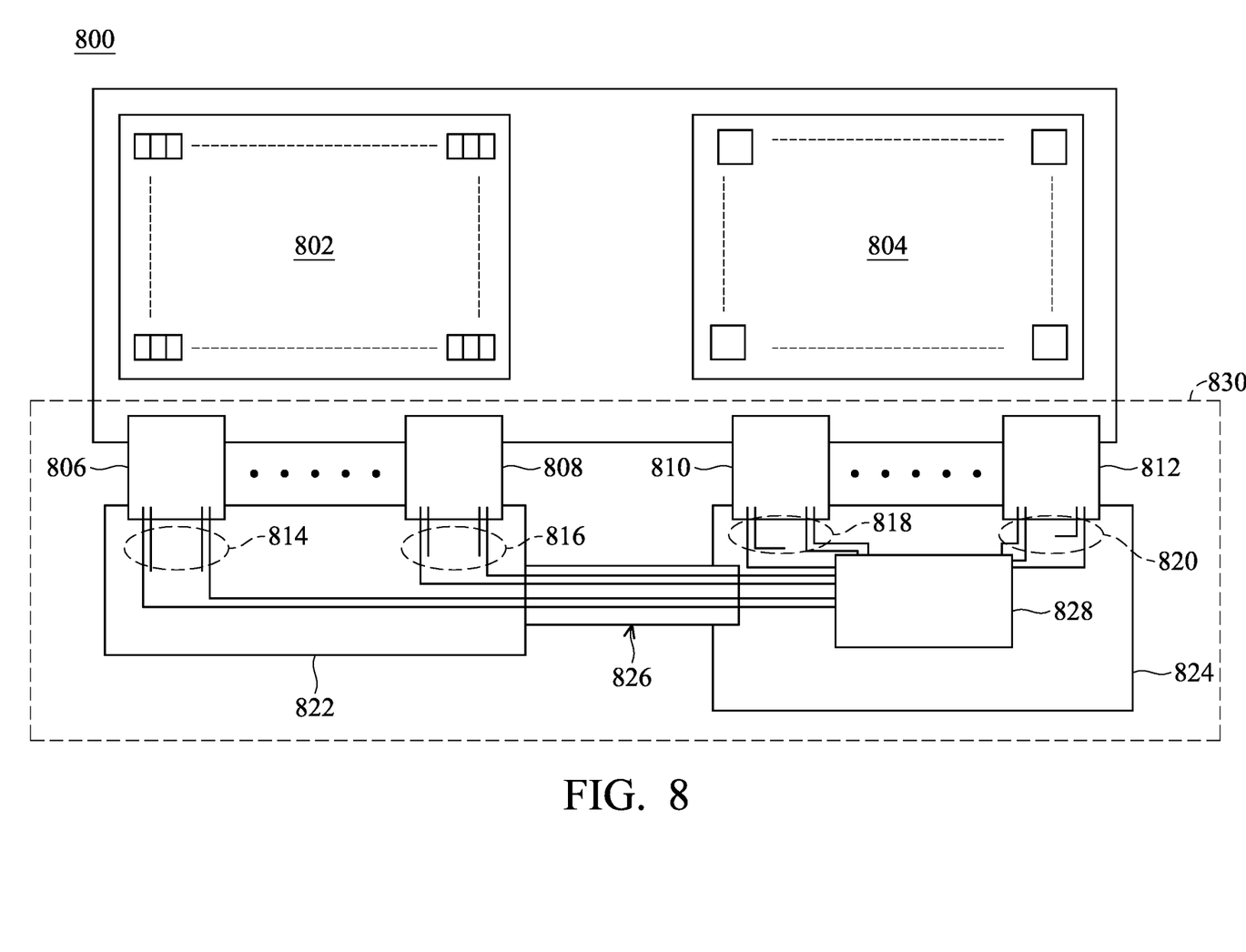
FIG. 8 is a schematic diagram of an electronic device in accordance with some embodiments of the present disclosure.

FIG. 8 is a schematic diagram of an electronic device 800 in accordance with some embodiments of the present disclosure. As shown in FIG. 8, the electronic device 800 includes a display panel 802, a touch display panel 804, a driving circuit assembly 830 electrically connected to the display panel 802 and the touch display panel 804. The display panel 802 may not have a touch detection function, and the touch panel 804 includes multiple sensing units, but the present disclosure is not limited thereto. In some embodiments, the display panel 802 may be, for example, a dashboard, but the present disclosure is not limited thereto. In some embodiments, the touch display panel may be, for example, a central control panel, but the present disclosure is not limited thereto. In some embodiments, the driving circuit assembly 830 includes multiple display driving chips (for example, the multiple display driving chips disposed on the circuit board 806 and the circuit 808), multiple touch display driving chips (for example, the multiple touch display driving chips disposed on the circuit board 810 and the circuit board 812), a sub driving circuit board 822, a sub driving circuit board 824, a connection bus 826, and a timing controller 828. In some embodiments, the cable 814, the cable 816, the cable 818, and the cable 820 are respectively electrically connected to the timing controller 828. Since a lot of noise interferes with the touch function of the touch display panel 804 when the vehicle is running, the method of touch detection disclosed in the present disclosure may be applied to the touch display panel 804 to save time and power consumption in the signal processing process. In some embodiments, when the touch function is not needed during the running of the vehicle, the timing controller 828 may further disable the touch function of the touch display panel 804, for example, disconnect the touch sensing lines in the cable 816 and the cable 818, to avoid coupling of the noise to the timing controller 828 during driving.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for touch detection, applicable to an electronic device with multiple sensing units, comprising:
    obtaining raw signal intensity distribution from the sensing units;
    performing a signal intensity determination process;
    performing a signal processing process according to the result of the signal intensity determination process;
    performing the signal processing process in a first mode when a raw signal intensity of at least one of the sensing units is higher than a first threshold;
    performing the signal processing process in a second mode when raw signal intensity of all the sensing units is lower than a second threshold; and
    performing the signal processing process in a third mode when the raw signal intensity of all the sensing units is between the first threshold and the second threshold;
    wherein the first threshold is higher than the second threshold.

2. The method as claimed in claim 1, wherein the signal processing process comprises a first debounce stage in the third mode.

3. The method as claimed in claim 2, wherein the signal processing process comprises a second de-noising stage in the first mode, the duration of the second debounce stage is longer than that of the first debounce stage.

4. The method as claimed in claim 1, wherein the signal processing process does not comprise a debounce stage in the second mode.

5. The method as claimed in claim 1, wherein the signal processing process comprises a first driving stage and a second driving stage in the first mode.

6. The method as claimed in claim 1, wherein the electronic device further comprises multiple display units; the display units display a first image at a first point in time and a second image at a second point in time; the method for touch detection is performed between the first point in time and the second point in time.

7. The method as claimed in claim 6, wherein the sensing units are set so as to correspond to the display units.

8. The method as claimed in claim 1, wherein the electronic device has a touch detection frequency and a frame refresh frequency, and the touch detection frequency is an integer multiple of the frame refresh frequency.

9. The method as claimed in claim 1, wherein the electronic device comprises a first panel, a second panel, and a driving circuit assembly; the driving circuit assembly is electrically connected to the first panel and the second panel, and the sensing units are disposed in the first panel.

10. An electronic device, comprising:
    multiple sensing units; and
    a touch-panel sensing chip, electrically connected to the sensing units through sensing lines;
    wherein the touch-panel sensing chip is configured to perform the following stages:
    obtaining raw signal intensity distribution from the sensing units;
    performing a signal intensity determination process;
    performing a signal processing process according to the result of the signal intensity determination process;
    performing the signal processing process in a first mode when the raw signal intensity of at least one of the sensing units is higher than a first threshold;

performing the signal processing process in a second mode when the raw signal intensity of all the sensing units is lower than a second threshold; wherein the first threshold is higher than the second threshold, and performing the signal processing process in a third mode when the raw signal intensity of all the sensing units is between the first threshold and the second threshold.

11. The electronic device as claimed in claim 10, wherein the signal processing process comprises a first debounce stage in the third mode.

12. The electronic device as claimed in claim 11, wherein the signal processing process comprises a second de-noising stage in the first mode, the duration of the second debounce stage is longer than that of the first debounce stage.

13. The electronic device as claimed in claim 10, wherein the signal processing process does not comprise a debounce stage in the second mode.

14. The electronic device as claimed in claim 10, wherein the signal processing process comprises a first driving stage and a second driving stage in the first mode.

15. The electronic device as claimed in claim 10, further comprising:

multiple display units, configured to display a first image at a first point in time and to display a second image at a second point in time;

wherein the touch-panel sensing chip performs the stages in claim 10 between the first point in time and the second point in time.

16. The electronic device as claimed in claim 15, wherein the sensing units are set so as to correspond to the display units.

17. The electronic device as claimed in claim 15, wherein the touch-panel sensing chip has a touch detection frequency and the display units have a frame refresh frequency; wherein the touch detection frequency is an integer multiple of the frame refresh frequency.

18. The electronic device as claimed in claim 15, wherein the sensing units are disposed in a first panel, the display units are disposed in the first panel and a second panel, and the touch-panel sensing chip is disposed in a driving circuit assembly.

* * * * *